United States Patent
Kidd et al.

(10) Patent No.: US 8,864,858 B1
(45) Date of Patent: Oct. 21, 2014

(54) METHODS OF FABRICATING A POLYCRYSTALLINE DIAMOND COMPACT INCLUDING GASEOUS LEACHING OF A POLYCRYSTALLINE DIAMOND BODY

(75) Inventors: Julie Ann Kidd, North Ogden, UT (US);
Michael A. Vail, Genola, UT (US);
Kenneth E. Bertagnolli, Riverton, UT (US)

(73) Assignee: US Synthetic Corporation, Orem, UT (US)

( * ) Notice: Subject to any disclaimer, the term of this patent is extended or adjusted under 35 U.S.C. 154(b) by 239 days.

(21) Appl. No.: 13/324,237

(22) Filed: Dec. 13, 2011

(51) Int. Cl.
| | |
|---|---|
| *B24D 3/00* | (2006.01) |
| *B24D 11/00* | (2006.01) |
| *B24D 18/00* | (2006.01) |
| *C09K 3/14* | (2006.01) |
| *B24B 1/00* | (2006.01) |
| *B24D 3/02* | (2006.01) |
| *C09C 1/68* | (2006.01) |

(52) U.S. Cl.
USPC .................................. 51/295; 51/293; 51/307

(58) Field of Classification Search
USPC ............................................ 51/293, 295, 307
See application file for complete search history.

(56) References Cited

U.S. PATENT DOCUMENTS

| | | | |
|---|---|---|---|
| 7,845,438 B1 * | 12/2010 | Vail et al. ...................... 175/434 |
| 7,866,418 B2 * | 1/2011 | Bertagnolli et al. ........ 175/420.2 |
| 7,909,900 B2 * | 3/2011 | Ras ................................. 51/309 |
| 2009/0139150 A1 * | 6/2009 | Ras ................................. 51/309 |
| 2011/0056141 A1 * | 3/2011 | Miess et al. ..................... 51/295 |
| 2012/0012401 A1 * | 1/2012 | Gonzalez et al. ............. 175/428 |

OTHER PUBLICATIONS

U.S. Appl. No. 61/523,659, filed Aug. 15, 2011, Gleason et al.

* cited by examiner

*Primary Examiner* — James McDonough
(74) *Attorney, Agent, or Firm* — Dorsey & Whitney LLP

(57) ABSTRACT

Embodiments of the invention relate to methods of fabricating polycrystalline diamond compacts ("PDCs") and applications for such PDCs. In an embodiment, a method of fabricating a PDC includes providing a polycrystalline diamond ("PCD") table in which a catalyst is disposed throughout, leaching the PCD table with a gaseous leaching agent to remove catalyst from the PCD table and bonding the at least partially leached PCD table to a substrate to form a PDC.

16 Claims, 8 Drawing Sheets

METHODS OF FABRICATING A POLYCRYSTALLINE DIAMOND COMPACT INCLUDING GASEOUS LEACHING OF A POLYCRYSTALLINE DIAMOND BODY

BACKGROUND

Wear-resistant, superabrasive compacts are utilized in a variety of mechanical applications. For example, polycrystalline diamond compacts ("PDCs") are used in drilling tools (e.g., cutting elements, gage trimmers, etc.), machining equipment, bearing apparatuses, wire-drawing machinery, and in other mechanical apparatuses.

PDCs have found particular utility as superabrasive cutting elements in rotary drill bits, such as roller cone drill bits and fixed cutter drill bits. A PDC cutting element typically includes a superabrasive diamond layer (also known as a diamond table). The diamond table is formed and bonded to a substrate using an ultra-high pressure, ultra-high temperature ("HPHT") process. The PDC cutting element may also be brazed directly into a preformed pocket, socket, or other receptacle formed in the bit body. The substrate may be often brazed or otherwise joined to an attachment member, such as a cylindrical backing. A rotary drill bit typically includes a number of PDC cutting elements affixed to the bit body. It is also known that a stud carrying the PDC may be used as a PDC cutting element when mounted to a bit body of a rotary drill bit by press-fitting, brazing, or otherwise securing the stud into a receptacle formed in the bit body.

Conventional PDCs are normally fabricated by placing a cemented-carbide substrate into a container or cartridge with a volume of diamond particles positioned adjacent to a surface of the cemented-carbide substrate. A number of such cartridges may be loaded into a HPHT press. The substrates and volume of diamond particles are then processed under HPHT conditions in the presence of a catalyst material that causes the diamond particles to bond to one another to form a matrix of bonded diamond grains defining a polycrystalline diamond ("PCD") table. The catalyst material is often a metal-solvent catalyst, such as cobalt, nickel, iron, or alloys thereof that is used for promoting intergrowth of the diamond particles.

In one conventional approach for forming a PDC, a constituent of the cemented-carbide substrate, such as cobalt from a cobalt-cemented tungsten carbide substrate, liquefies and sweeps from a region adjacent to the volume of diamond particles into interstitial regions between the diamond particles during the HPHT process. The cobalt acts as a solvent catalyst to promote intergrowth between the diamond particles, which results in formation of bonded diamond grains. A solvent catalyst may be mixed with the diamond particles prior to subjecting the diamond particles and substrate to the HPHT process.

In another conventional approach for forming a PDC, a sintered PCD table may be separately formed and then leached to remove solvent catalyst from interstitial regions between bonded diamond grains. The leached PCD table may be simultaneously HPHT bonded to a substrate and infiltrated with a non-catalyst material, such as silicon, in a separate HPHT process. The silicon may infiltrate the interstitial regions of the sintered PCD table from which the solvent catalyst has been leached and react with the diamond grains to form silicon carbide.

Despite the availability of a number of different PCD materials, manufacturers and users of PCD materials continue to seek PCD materials that exhibit improved toughness, wear resistance, and/or thermal stability.

SUMMARY

Embodiments of the invention relate to methods of fabricating PDCs and applications for such PDCs. In an embodiment, a method of fabricating a PDC includes providing a PCD table including a plurality of bonded diamond grains defining a plurality of interstitial regions in which a metal-solvent catalyst is disposed. The PCD table may then be leached with a gaseous leaching agent to at least partially remove the metal-solvent catalyst from the PCD table. The at least partially leached PCD table may then be bonded to a substrate to form the PDC.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the invention, wherein identical reference numerals refer to identical elements or features in different views or embodiments shown in the drawings.

DETAILED DESCRIPTION

Embodiments of the invention relate to methods of fabricating PDCs and PCD tables in a manner that facilitates removal of metal-solvent catalyst used in the manufacture of PCD tables of such PDCs. The PDC embodiments disclosed herein may be used in a variety of applications, such as rotary drill bits, bearing apparatuses, wire-drawing dies, machining equipment, and other articles and apparatuses.

FIGS. 1A-1E are cross-sectional views illustrating a method of fabricating a PDC according to an embodiment that comprises forming a PCD table from a plurality of diamond particles and a catalyst in a first HPHT process and at least partially leaching the so-formed PCD table by exposing the PCD table to a flow of a gaseous leaching agent. A PDC is formed by bonding the at least partially leached PCD table to a substrate in a second HPHT process. Such a method may provide for more effective leaching of the catalyst from the PCD table before and/or after bonding to the substrate.

Figure 1A:
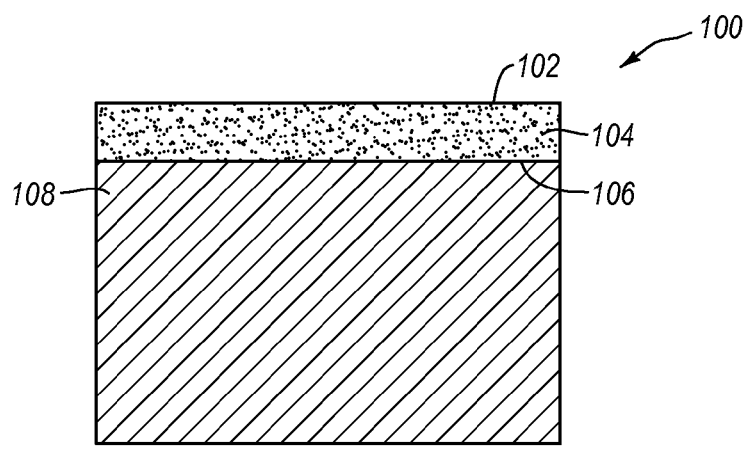
FIGS. 1A-1E are cross-sectional views illustrating a method of fabricating a PDC according to an embodiment.
Figure 1B:
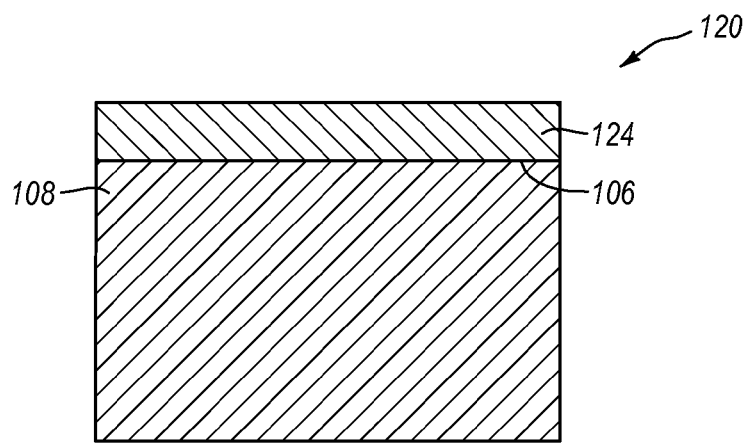

Referring to FIG. 1A, a cross-sectional view of an assembly 100 is illustrated in which a mass of a plurality of diamond particles 104 are placed adjacent to a substrate 108. A PCD table 124 as shown in FIG. 1B may be fabricated by subjecting the plurality of diamond particles 104 (e.g., diamond particles having an average particle size between 0.5 μm to about 150 μm) to an HPHT sintering process in the presence of a catalyst, such as cobalt, nickel, iron, or an alloy of any of the preceding metals to facilitate intergrowth between the diamond particles 104 and form the PCD table 124 (FIG. 1B) comprising directly bonded-together diamond grains (e.g., exhibiting $sp^3$ bonding) defining interstitial regions with the catalyst disposed within at least a portion of the interstitial regions. In the illustrated embodiment, the PCD table 124 is formed by sintering the diamond particles 104 on the substrate 108, which may be a cobalt-cemented tungsten carbide substrate from which cobalt or a cobalt alloy infiltrates into the diamond particles 104. For example, the substrate 108 may comprise a cemented carbide material, such as a cobalt-cemented tungsten carbide material or another suitable material. For example, nickel, iron, and alloys thereof are other catalysts that may form part of the substrate 108. Other materials for the substrate 108 include, without limitation, cemented carbides including titanium carbide, niobium carbide, tantalum carbide, vanadium carbide, and combinations of any of the preceding carbides cemented with iron, nickel, cobalt, or alloys thereof. However, in other embodiments, the substrate 108 may be replaced with a metal-solvent catalyst disc and/or catalyst particles may be mixed with the diamond particles 104.

The diamond particle size distribution of the plurality of diamond particles 104 may exhibit a single mode, or may be a bimodal or greater grain size distribution. In an embodiment, the diamond particles 104 may comprise a relatively larger size and at least one relatively smaller size. As used herein, the phrases "relatively larger" and "relatively smaller" refer to particle sizes (by any suitable method) that differ by at least a factor of two (e.g., 30 μm and 15 μm). According to various embodiments, the diamond particles 104 may include a portion exhibiting a relatively larger average particle size (e.g., 50 μm, 40 μm, 30 μm, 20 μm, 15 μm, 12 μm, 10 μm, 8 μm) and another portion exhibiting at least one relatively smaller average particle size (e.g., 6 μm, 5 μm, 4 μm, 3 μm, 2 μm, 1 μm, 0.5 μm, less than 0.5 μm, 0.1 μm, less than 0.1 μm). In an embodiment, the diamond particles 104 may include a portion exhibiting a relatively larger average particle size between about 10 μm and about 40 μm and another portion exhibiting a relatively smaller average particle size between about 1 μm and 4 μm. In some embodiments, the diamond particles 104 may comprise three or more different average particle sizes (e.g., one relatively larger average particle size and two or more relatively smaller average particle sizes), without limitation.

FIG. 1B illustrates a cross-sectional view of a PDC 120 formed by HPHT processing of the assembly 100 shown in FIG. 1A. In such an embodiment, the PCD table 124 so-formed may include tungsten and/or tungsten carbide that is swept in with the catalyst from the substrate 108. For example, some tungsten and/or tungsten carbide from the substrate may be dissolved or otherwise transferred by the liquefied catalyst (e.g., cobalt from a cobalt-cemented tungsten carbide substrate) of the substrate 108 that sweeps into the diamond particles 104. Additional details about methods of manufacturing the PDC 120 and magnetic properties of the PCD table 124 may be found in U.S. Pat. No. 7,866,418, which is incorporated herein, in its entirety, by this reference.

Figure 1C:
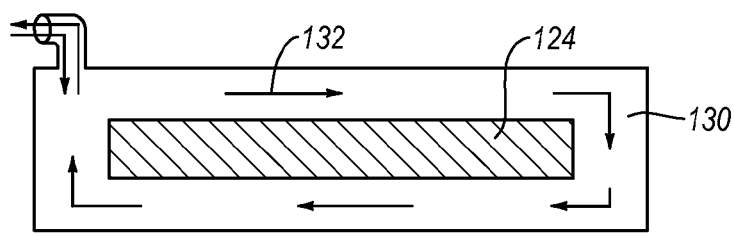
Figure 1D:
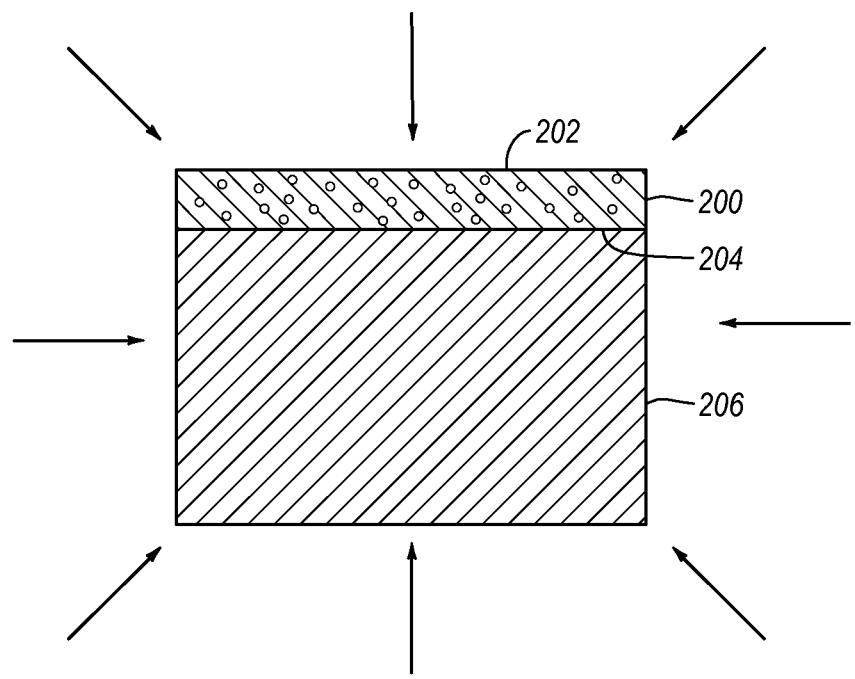

The PCD table 124, shown in FIG. 1B, may be separated from the substrate 108 using a lapping process, a grinding process, wire-electrical-discharge machining ("wire EDM"), combinations thereof, or another suitable material-removal process. As shown in FIG. 1C, the separated PCD table 124 may be enclosed in a suitable reaction chamber 130 containing a flow of a gaseous leaching agent 132 that is selected to substantially remove all of the catalyst from the interstitial regions of the separated PCD table 124 and form an at least partially leached PCD table 200 as shown in FIG. 1D. In an embodiment, the sintered diamond grains of an at least partially leached PCD table 200 may exhibit an average grain size of about 20 μm or less.

Gaseous leaching agents may be used to remove at least a portion of the catalyst from the PCD table 124. The gaseous leaching agent may be selected from at least one halide gas, at least one inert gas, a gas from the decomposition of an ammonium halide salt, hydrogen gas, carbon monoxide gas, an acid gas, and mixtures thereof. For example, a gaseous leaching agent may include mixtures of a halogen gas (e.g., chlorine, fluorine, bromine, iodine, or combinations thereof) and an inert gas (e.g., argon, xenon, neon, krypton, radon, or combinations thereof). Other gaseous leaching agents include mixtures including hydrogen chloride gas, a reducing gas (e.g., carbon monoxide gas), gas from the decomposition of an ammonium salt (such as ammonium chloride which decomposes into chlorine gas, hydrogen gas and nitrogen gas), and mixtures of hydrogen gas and chlorine gas (which will form hydrogen chloride gas, in situ), acid gases such as hydrogen chloride gas, hydrochloric acid gas, hydrogen fluoride gas, and hydrofluoric acid gas. Any combination of any of the disclosed gases may be employed as the gaseous leaching agent. In an embodiment, the reaction chamber 130 may be filled with a gaseous leaching agent of about 10 volume % to about 20 volume % chlorine with the balance being argon and the gaseous leaching agent being at an elevated temperature of at least about 300° C. to about 800° C. In another embodiment, the elevated temperature may be between at least about 600° C. to about 700° C. More specifically, in another embodiment, the elevated temperature may be at least about 650° C. to about 700° C.

In an embodiment, the leaching process may take place in the reaction chamber 130 placed within a box furnace. For example, the reaction chamber 130 may be flushed at room temperature with an inert gas, such as argon. The reaction chamber 130 is heated under a flow of argon at a rate of about 10° C./min, to the desired elevated temperature. According to an embodiment, once the reaction chamber 130 reaches the desired temperature of, for example, 700° C., the gaseous leaching agent is introduced at a flow rate of 900 ml/min (measured at STP, 25° C., and 1 atm) to create the gaseous flow 132 within the reaction chamber 130 as shown in FIG. 1C. The flow rate of the gaseous leaching agent may optionally be consistently maintained for the duration of the leaching reaction ranging from 15 minutes to 12 hours, depending on reaction conditions (i.e., the temperature selected, gaseous leaching agent used, the selected leach depth desired, etc.).

In an embodiment, a gaseous leaching agent including at least about 0.1% to less than about 100% chlorine gas, with the balance comprised of argon gas may be used at a temperature of 700° C. and a flow rate of 900 ml/min for at least 1 hour. In an embodiment, a gaseous leaching agent comprising 20% carbon monoxide, 20% chlorine and 60% argon may be used at a temperature of 600° C. and a flow rate of 900 ml/min for at least 1 hour. In another embodiment, a gaseous leaching agent comprising 20% chlorine, 20% hydrogen chloride and 60% argon may be used at a temperature of 700° C. and a flow rate of 900 ml/min for at least 1 hour. In yet another embodiment, a gaseous leaching agent comprising 20% chlorine and 80% argon may be used at a temperature of 700° C. and a flow rate of 900 ml/min for at least 1 hour.

FIG. 1D illustrates a cross-sectional view of an assembly of an at least partially leached PCD table 200 (i.e., a porous, PCD table) and a substrate 206 that may be made from the same materials as the substrate 108 previously discussed. The at least partially leached PCD table 200, includes a first surface 202 and an opposing second interfacial surface 204. The at least partially leached PCD table 200 includes a plurality of interstitial regions that were previously occupied by the catalyst and form a network of at least partially interconnected pores that extend between the first surface 202 and the second interfacial surface 204.

Figure 1E:
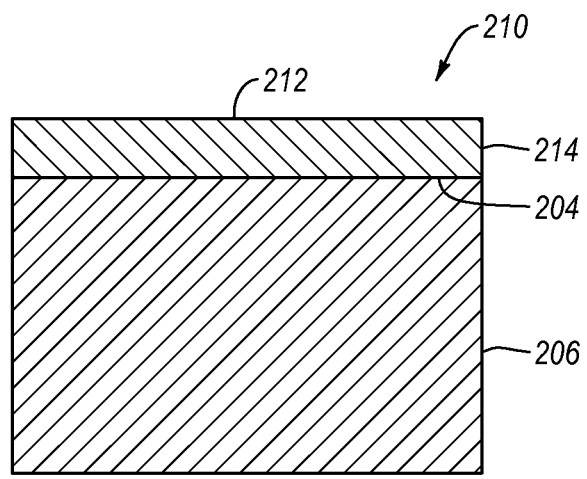

The assembly, shown in FIG. 1D, of the at least partially leached PCD table 200 and substrate 206 may be placed in a pressure transmitting medium, such as a refractory metal can, graphite structure, pyrophyllite or other pressure transmitting structure, or another suitable container or supporting element. The pressure transmitting medium, including the assembly, may be subjected to an HPHT process using an HPHT press at a temperature of at least about 1000° C. (e.g., about 1300° C. to about 1600° C.) and a pressure of at least 4 GPa (e.g., about 5 GPa to about 10 GPa, about 7 GPa to about 9 GPa) for a time sufficient to bond the at least partially leached PCD table 200 to the substrate 206 and form a PDC 210 as shown in FIG. 1E. The HPHT process bonds the at least partially leached PCD table 200 to the substrate 206 and may cause metallic infiltrant from the substrate 206 or another source to infiltrate the interstitial regions of the at least partially leached PCD table 200. The HPHT temperature may be sufficient to melt at least one constituent of the substrate 206 (e.g., cobalt, nickel, iron, alloys thereof, or another constituent) that infiltrates the at least partially leached PCD table 200. The PDC 210 so-formed includes an infiltrated PCD table 214 in which the interstitial regions thereof are at least partially filled with the infiltrant. It is noted that the PDC 210 may exhibit other geometries than the geometry illustrated in FIG. 1E. For example, the PDC 210 may exhibit a non-cylindrical geometry.

In some embodiments, the PDC 210 so-formed may be subjected to a number of different shaping operations. For example, an upper working surface 212 may be planarized and/or polished. Additionally, a peripherally-extending chamfer may be formed that extends between the upper working surface 212 and a side surface of the infiltrated PCD table 214. The shaping operations include lapping, grinding, wire EDM, combinations thereof, or another suitable material-removal process.

As a result of the leaching process used to remove the catalyst, the at least partially leached PCD table 200 shown in FIG. 1D may include leaching by-products. For example, the gaseous leaching agent used to remove, for example, cobalt from the interstitial regions may leave one or more types of residual salts, one or more types of oxides, combinations of the foregoing, or another leaching by-product within at least some of the interstitial regions of the at least partially leached PCD table 200. For example, depending upon the chemistry of the leaching solution, the leaching by-products may comprise a salt of nitric acid, hydrochloric acid, phosphoric acid, acetic acid, or mixtures of the foregoing. For example, the salt may be cobalt nitrate or cobalt chloride. The leaching by-products may also comprise a metal oxide, such as an oxide of tungsten, cobalt or other metal-solvent catalyst, and/or another type of metal present in the catalyst of the at least partially leached PCD table 200 prior to leaching. It is currently believed that such leaching by-products may block, obstruct, or otherwise inhibit infiltration of the at least partially leached PCD table 200 with metallic infiltrant, such as cobalt, when the at least partially leached PCD table 200 is bonded to the substrate 206. Additionally, such leaching by-products may inhibit back filling with a non-catalyst material such as silicon.

Figure 2A:
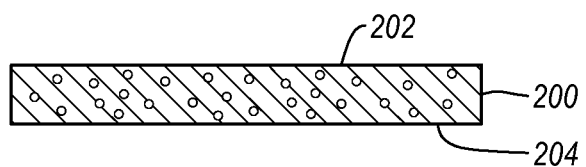
FIGS. 2A and 2B are cross-sectional views illustrating a method of cleaning the at least partially leached PCD table shown in FIG. 1D prior to being bonding to a substrate according to an embodiment.
Figure 2B:
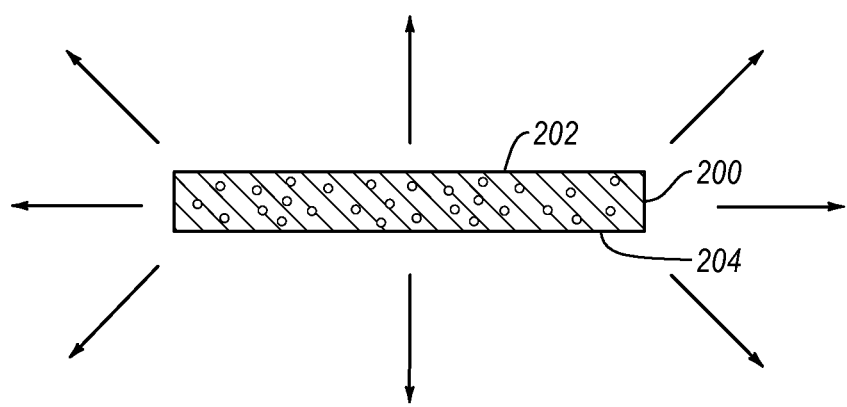

Referring to FIG. 2A, at least some of the leaching by-products may be removed from the at least partially leached PCD table 200. For example, as shown in FIG. 2B, at least some of the leaching by-products may be removed by subjecting the at least partially leached PCD table 200 to a thermal-cleaning process. In such a thermal-cleaning process, the at least partially leached PCD table 200 may be heated under partial vacuum (e.g., at a pressure less than ambient atmospheric pressure) to a temperature sufficient to sublimate at least some of the leaching by-products present in the at least partially leached PCD table 200, but below a temperature at which the diamond grains of the at least partially leached PCD table 200 may significantly degrade. For example, the at least partially leached PCD table 200 may be heated in a vacuum furnace at a temperature between at least about 500° C. and less than about 700° C. for about 0.5 hours to about 2.0 hours or more. In an embodiment, the at least partially leached PCD table 200 may be heated in a vacuum furnace at a temperature of about 650° C. for about 1 hour to about 1.5 hours.

In another embodiment, the at least partially leached PCD table 200 may be cleaned using an autoclave under diamond-stable conditions in which heat and pressure is applied at a temperature and pressure sufficient to sublimate at least some of the leaching by-products present in the at least partially leached PCD table 200. Suitable elevated temperature levels used in the autoclave process may range from approximately the boiling point of the leaching agent and/or the leaching by-products to three times the boiling point of the leaching agent and/or the leaching by-products. For example, in an embodiment, the elevated temperature of the autoclave process may be about 90° C. to about 350° C., such as about 175° C. to about 225° C. In other embodiments, the elevated temperature may be up to about 300° C. The pressure of the autoclave process may be selected so that diamond-stable or non-stable conditions are used, such as a pressure of about 0.5 MPa to about 3 GPa (e.g., about 1 GPa to about 2 GPa).

In another embodiment, at least some of the leaching by-products may be removed from the at least partially leached PCD table 200 using a chemical cleaning process. For example, the at least partially leached PCD table 200 may be immersed in hydrofluoric acid. The concentration of the hydrofluoric acid and the immersion time of the at least partially leached PCD table 200 in the hydrofluoric acid may be selected so that at least some of the leaching by-products and, in some embodiments, substantially all of the leaching by-products may be removed from the at least partially leached PCD table 200. In other embodiments, nitric acid, sulfuric acid, hydrochloric acid, hydrogen peroxide, phosphoric acid, perchloric acid, any combination of foregoing acids, or the like, may be selected in place of hydrofluoric acid as a chemical cleaning agent.

In an embodiment of a chemical cleaning process, at least some of the leaching by-products may be removed using an ultrasonic cleaning process. For example, the at least partially leached PCD table 200 of FIG. 2A may be immersed in a selected solvent and ultrasonic energy applied to the selected solvent for a selected period of time to effect removal of at least some of the leaching by-products and, in some embodiments, substantially all of the leaching by-products may be removed from the at least partially leached PCD table 200. The selected solvent may be an aqueous solution (e.g., hydrofluoric acid) or an organic solvent. In other embodiments using the thermal or autoclave cleaning processes discussed herein, the cleaning processes may also be supplemented by the application of ultrasonic energy. Such ultrasonic methods can decrease required cleaning time, and may increase the efficiency of thermal, autoclave, and chemical cleaning processes.

In another embodiment, following removal of at least some of the leaching by-products, the second interfacial surface 204 of the at least partially leached PCD table 200 may be bonded to a substrate in an HPHT bonding process to form a PDC in the same manner as the at least partially leached PCD table 200 was bonded to form the PDC 210 shown in FIGS. 1D and 1E.

Additional details about techniques for cleaning the at least partially leached PCD table 200 may be found in U.S. Pat. No. 7,845,438. U.S. Pat. No. 7,845,438 is incorporated herein, in its entirety, by this reference.

Figure 3A:
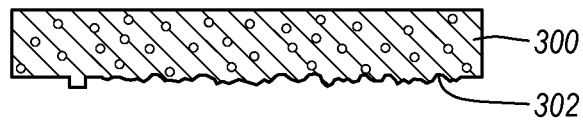
FIGS. 3A-3D are cross-sectional views illustrating a method of reducing a non-planarity of an interfacial surface of the at least partially leached PCD table shown in FIG. 1D prior to bonding to a substrate according to an embodiment.
Figure 3B:
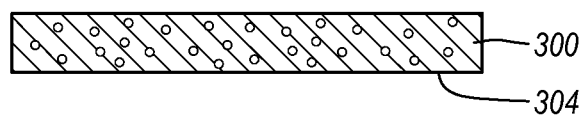

FIG. 3A illustrates a cross-sectional view of an at least partially leached and cleaned PCD table 300. In the embodiment of FIG. 3A, after cleaning to remove at least some of the leaching by-products, a second interfacial surface 302 may be substantially planarized to reduce a non-planarity thereof. For example, the planarizing may be accomplished using a planarizing machine, such as a lapping pad, a grinding pad, or other mechanical or chemical-mechanical planarization machine. Substantially planarizing the second interfacial surface 302 of the at least partially leached PCD table 300 by removing material therefrom results in formation of a substantially planarized interfacial surface 304 as shown in FIG. 3B. It is noted that the substantially planarized interfacial surface 304 may or may not include part of the former second interfacial surface 302 depending upon the amount of material removed from the at least partially leached PCD table 300. The substantially planarized interfacial surface 304 may exhibit a flatness of about 0.00050 inch to about 0.0010 inch. In another embodiment, the flatness may be about 0.00050 inch to about 0.0075 inch.

Figure 3C:
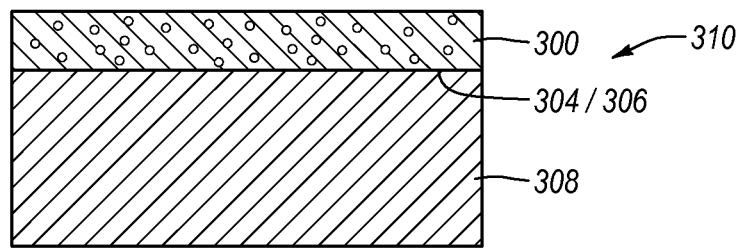
Figure 3D:
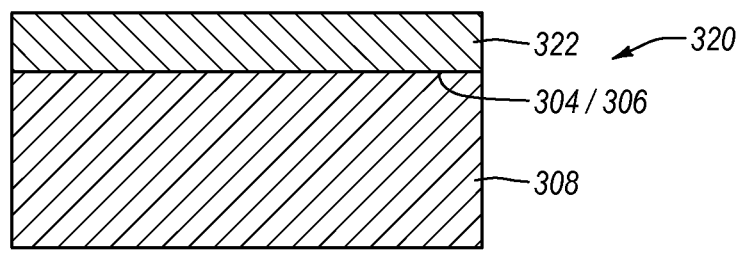

Referring to FIG. 3C, the substantially planarized interfacial surface 304 of the at least partially leached PCD table 300 may be placed at least proximate to a substrate 308 to form an assembly 310. For example, in an embodiment, the substantially planarized interfacial surface 304 may abut with a surface 306 of the substrate 308. The substrate 308 may be made from any the materials discussed above for the substrate 108. The assembly 310 may be subjected to HPHT processing for a time sufficient to bond the at least partially leached PCD table 300 to the substrate 308 and form a PDC 320 as shown in FIG. 3D. The HPHT process bonds the at least partially leached PCD table 300 to the substrate 308 and may cause a metallic infiltrant from the substrate 308 or another source to infiltrate the interstitial regions of the at least partially leached PCD table 300. The HPHT temperature may be sufficient to melt at least one constituent of the substrate 308 (e.g., cobalt, nickel, iron, alloys thereof, or another constituent) that infiltrates the substrate 308. The PDC 320 so-formed includes a PCD table 322 in which the interstitial regions thereof are at least partially filled with the metallic infiltrant. It is noted that the PDC 320 may exhibit other geometries than the geometry illustrated in FIG. 3D. For example, the PDC 320 may exhibit a non-cylindrical geometry.

Because the at least partially leached PCD table 300 was leached with a gaseous leaching agent and cleaned to remove at least some of the leaching by-products prior to bonding to the substrate 308, the PCD table 322 so-formed is believed to have at least one of improved thermal stability, manufacturability, or performance. In embodiments where the second interfacial surface 302 is substantially planarized, (as shown in FIGS. 3A and 3B), because the substantially planarized interfacial surface 304 of the at least partially leached PCD table 300 is substantially planar, the HPHT process used to form the PDC 320 may not introduce tensile bending stresses sufficient to cause cracking, and/or spalling in the PCD table 322 during the HPHT process.

It should be noted that, in some embodiments, the planarization process described in FIGS. 3A-3D may be performed on an un-cleaned at least partially leached PCD table 200 instead of the at least partially leached and cleaned PCD table 300. In other embodiments, the cleaning process may be performed after the planarization process described in FIGS. 3A-3D.

Figure 4A:
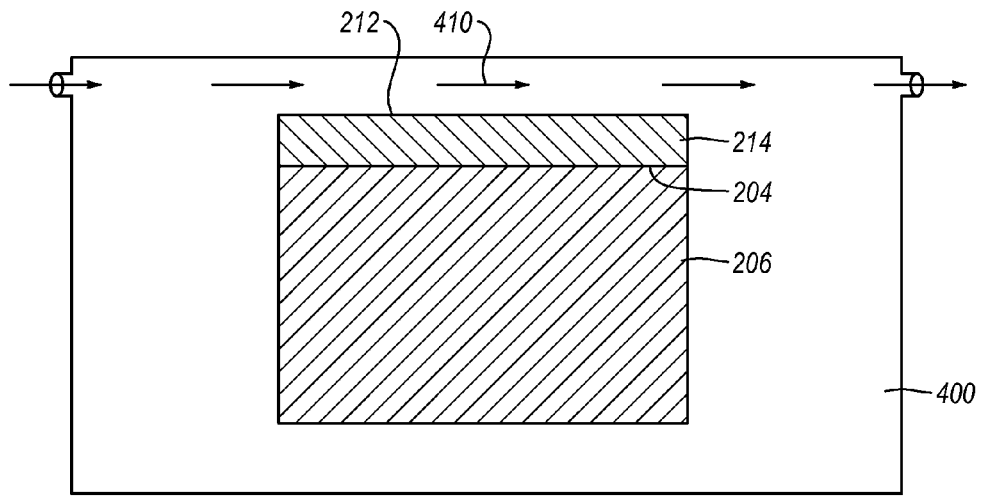
FIGS. 4A and 4B are cross-sectional views illustrating a method of leaching a PCD table of a PDC using a gaseous leaching agent according to another embodiment.
Figure 4B:
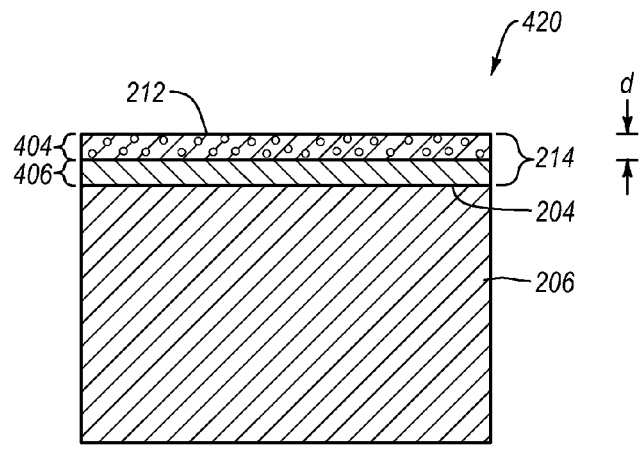

Referring to FIGS. 4A and 4B, in an embodiment, the infiltrated PCD table 214 of the PDC 210 (shown in FIG. 1E) may be leached with a gaseous leaching agent to remove a metallic infiltrant that forms part of the infiltrated PCD table 214 to a selected leach depth d measured from an upper working surface 212. In some embodiments, the infiltrated PCD table 214 may be chamfered before being subjected to the gaseous leaching process shown in FIG. 4A. For example, the infiltrated PCD table 214 may be enclosed in a reaction chamber 400, as illustrated in FIG. 4A, containing a flow of the gaseous leaching agent 410 (e.g., a mixture of the halogen, chlorine gas, and an inert gas, argon gas) to leach the metallic infiltrant from the infiltrated PCD table 214 to form a first volume 404, shown in FIG. 4B, substantially free of the metallic infiltrant and remote from a substrate 206. A second volume 406, proximate to the substrate 206, is relatively unaffected by the leaching process and includes the metallic infiltrant therein.

Although not shown, the substrate 206 and selected portions of the infiltrated PCD table 214 may be masked or otherwise protected to limit unintended leaching and damage to the masked portions. In an embodiment selected portions of the infiltrated PCD table 214 may be subjected to a masking treatment to mask areas that are desired to remain unaffected by the leaching process, such as portions of the second volume 406 at and/or near the substrate 206. For example, electrodeposition or plasma deposition of a nickel alloy (e.g., a suitable Inconel® alloy), a suitable metal, or a metallic alloy covering the substrate 206 and the second volume 406 may be used to limit the leaching process to the desired directed area, the first volume 404. In other embodiments, protective leaching trays and cups for protecting portions of the infiltrated PCD table 214 and substrate 206 from leaching solution during leaching may be used. Such methods are disclosed in U.S. Patent Application No. 61/523,659 filed on 15 Aug. 2011, which is incorporated herein, in its entirety, by this reference. In another embodiment, a leaching cup made from a nickel alloy may be placed around a portion of the infiltrated PCD table 214 to serve as a shield to mask or otherwise protect a selected portion of the infiltrated PCD table 214 from the leaching process.

In an embodiment, as shown in FIG. 4B, the leach depth d that the first volume 404 extends to may be greater than about 200 µm. In another embodiment, the leach depth d may be about 50 µm to about 800 µm. In another embodiment, the leach depth d may be about 400 µm to about 800 µm. In embodiments in which the at least partially leached PCD table is cleaned prior to bonding to the substrate 206, even after partially leaching the infiltrated PCD table 214, at least a region of the infiltrated PCD table 214 proximate to and including the interfacial surface 204 (or the substantially planarized interfacial surface 304) may be substantially free of leaching by-products. In another embodiment, the infiltrated PCD table 214 may be leached so that the leach depth d may be approximately equal to a thickness of the infiltrated PCD table 214.

After leaching the infiltrated PCD table 214, the infiltrated PCD table 214 may be treated using any of the previously described cleaning processes, such as thermal or chemical cleaning, to remove some or substantially all leaching by-products therefrom from the first volume 404. It is currently believed that removing at least some of the leaching by-products from the infiltrated PCD table 214 may increase at least one of the thermal stability, manufacturability, or performance. of the leached PCD table.

Any and all of the embodiments of the PDC fabrication methods discussed herein, including the embodiments shown in FIGS. 1-4, may include the forming of a PCD table using a first HPHT process. Further, embodiments of the invention may comprise a method including at least one or more of the following acts: forming a PCD table in a first HPHT process, removing a PCD table from a substrate, leaching of a PCD table using a gaseous leaching agent to at least partially remove metal catalyst or metallic infiltrant filled within the interstitial regions of the PCD table, cleaning of the at least partially leached PCD table to remove leaching by-products, substantially planarizing a surface of the at least partially leached PCD table, bonding of the at least partially leached PCD table to a substrate in a second HPHT process, infiltrating the interstitial regions of the at least partially leached PCD table with a metallic infiltrant from the substrate to form a PDC, leaching the at least partially infiltrated PCD table of the PDC using a gaseous leaching agent to a specified depth, and subjecting the leached, infiltrated PCD table of the PDC to cleaning using at least one of the thermal, chemical, or ultrasonic cleaning methods discussed herein. The first cleaning and planarizing steps (before bonding the leached PCD table to a substrate to form a PDC) may be interchanged so that the planarizing may occur either prior to or after the first cleaning step. Any of the foregoing methods, acts, as well as portions or combinations thereof disclosed herein are contemplated as embodiments of the invention.

Figure 5:
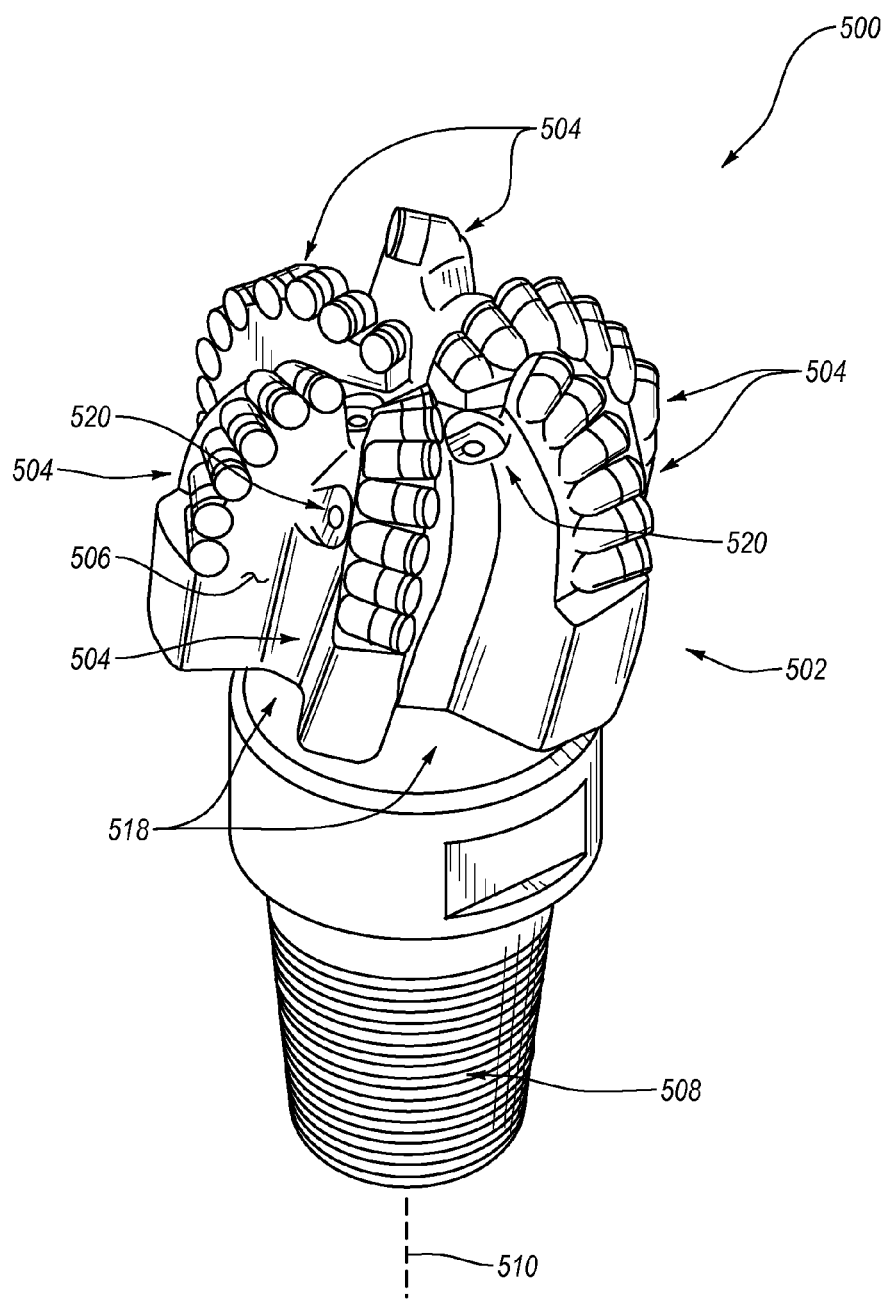
FIG. 5 is an isometric view of a rotary drill bit according to an embodiment that may employ one or more of the disclosed PDCs fabricated according to any of the embodiments disclosed herein.
Figure 6:
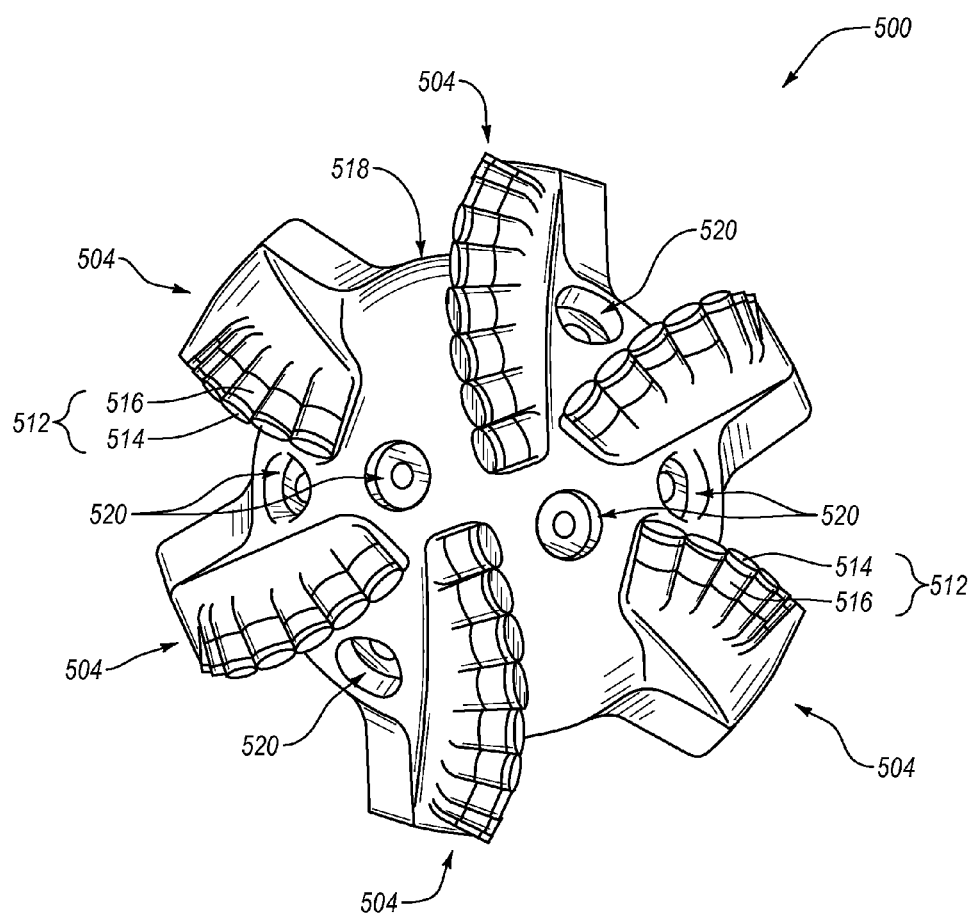
FIG. 6 is a top elevation view of the rotary drill bit shown in FIG. 5.

FIG. 5 is an isometric view and FIG. 6 is a top elevation view of a rotary drill bit 500 according to an embodiment. The rotary drill bit 500 includes at least one PDC fabricating according to any of the previously described PDC embodiments. The rotary drill bit 500 comprises a bit body 502 that includes radially and longitudinally extending blades 504 with leading faces 506, and a threaded pin connection 508 for connecting the bit body 502 to a drilling string. The bit body 502 defines a leading end structure configured for drilling into a subterranean formation by rotation about a longitudinal axis 510 and application of weight-on-bit. At least one PDC cutting element, manufactured and configured according to any of the previously described PDC embodiments (e.g., the PDC 210 shown in FIG. 1E), may be affixed to rotary drill bit 500 by, for example, brazing, mechanical affixing, or another suitable technique. With reference to FIG. 6, each of a plurality of PDCs 512 is secured to the blades 504. For example, each PDC 512 may include a PCD table 514 bonded to a substrate 516. More generally, the PDCs 512 may comprise any PDC disclosed herein, without limitation. In addition, if desired, in an embodiment, a number of the PDCs 512 may be conventional in construction. Also, circumferentially adjacent blades 504 define so-called junk slots 518 therebetween, as known in the art. Additionally, the rotary drill bit 500 includes a plurality of nozzle cavities 520 for communicating drilling fluid from the interior of the rotary drill bit 500 to the PDCs 512.

FIGS. 5 and 6 merely depict one embodiment of a rotary drill bit that employs at least one cutting element comprising a PDC fabricated and structured in accordance with the disclosed embodiments, without limitation. The rotary drill bit 500 is used to represent any number of earth-boring tools or drilling tools, including, for example, core bits, roller-cone bits, fixed-cutter bits, eccentric bits, bicenter bits, reamers, reamer wings, mining rotary drill bits, or any other downhole tool including PDCs, without limitation.

The PDCs disclosed herein may also be utilized in applications other than rotary drill bits. For example, the disclosed PDC embodiments may be used in thrust-bearing assemblies, radial bearing assemblies, wire-drawing dies, artificial joints, machining elements, PCD windows, and heat sinks.

Figure 7:
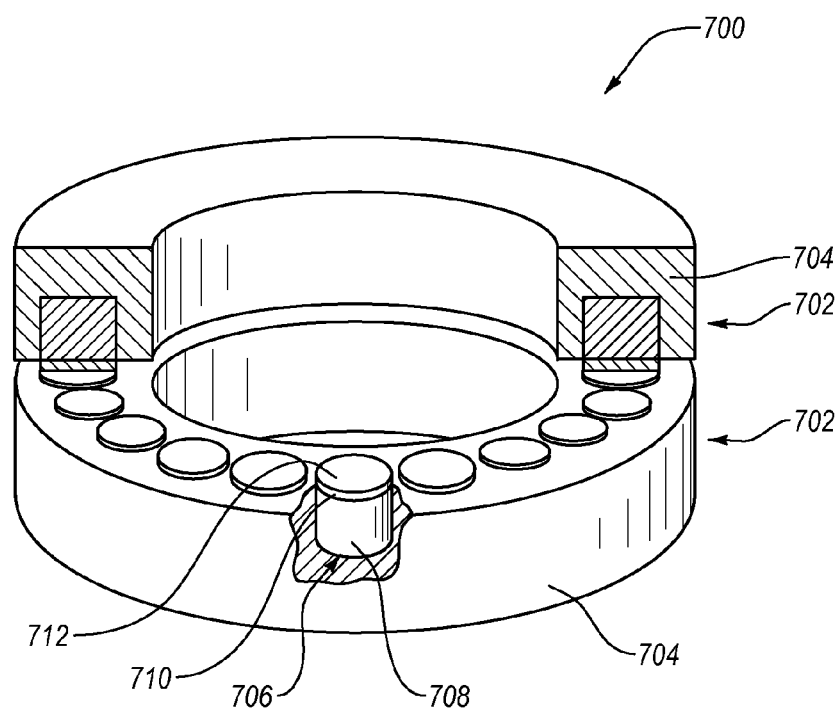
FIG. 7 is an isometric cut-away view of a thrust-bearing apparatus according to an embodiment, which may utilize any of the disclosed PDC fabricated according to any of the embodiments disclosed herein as bearing elements.

FIG. 7 is an isometric cut-away view of a thrust-bearing apparatus 700 according to an embodiment, which may utilize any of the disclosed PDC embodiments as bearing elements. The thrust-bearing apparatus 700 includes respective thrust-bearing assemblies 702. Each thrust-bearing assembly 702 includes an annular support ring 704 that may be fabricated from a material, such as carbon steel, stainless steel, or another suitable material. Each support ring 704 includes a plurality of recesses (not labeled) that receives a corresponding bearing element 706. Each bearing element 706 may be mounted to a corresponding support ring 704 within a corresponding recess by brazing, press-fitting, using fasteners, or another suitable mounting technique. One or more, or all of bearing elements 706 may be manufactured and configured according to any of the disclosed PDC embodiments. For example, each bearing element 706 may include a substrate 708 and a PCD table 710, with the PCD table 710 including a bearing surface 712.

In use, the bearing surfaces 712 of one of the thrust-bearing assemblies 702 bears against the opposing bearing surfaces 712 of the other one of the bearing assemblies 702. For example, one of the thrust-bearing assemblies 702 may be operably coupled to a shaft to rotate therewith and may be termed a "rotor." The other one of the thrust-bearing assemblies 702 may be held stationary and may be termed a "stator."

Figure 8:
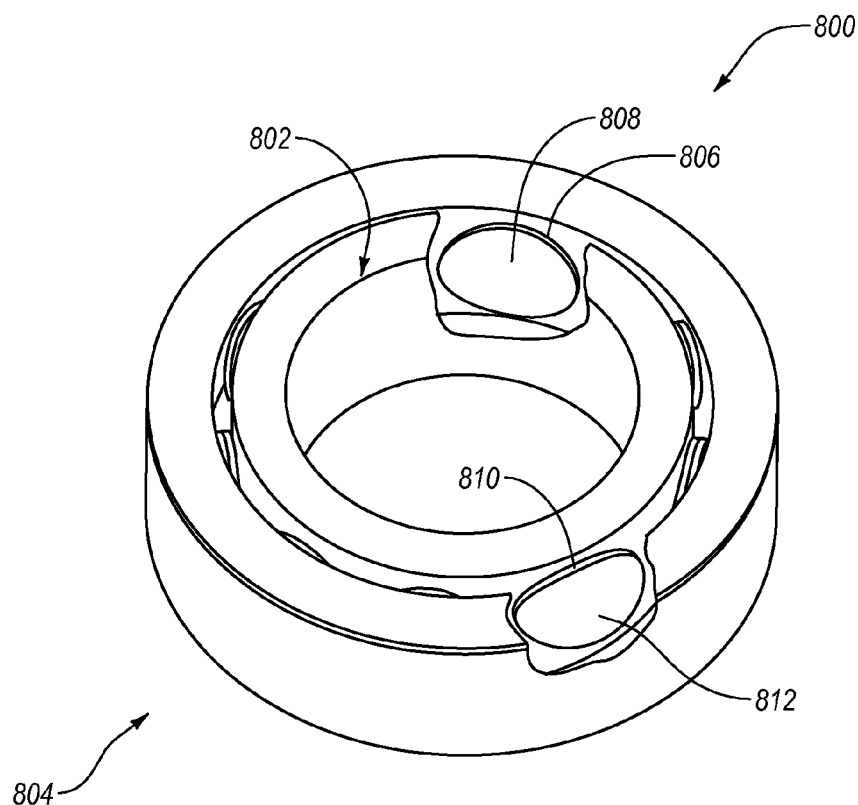
FIG. 8 is an isometric cut-away view of a radial bearing apparatus according to an embodiment, which may utilize any of the disclosed PDC fabricated according to any of the embodiments disclosed herein as bearing elements.

FIG. 8 is an isometric cut-away view of a radial bearing apparatus 800 according to an embodiment, which may utilize any of the disclosed PDC embodiments as bearing elements. The radial bearing apparatus 800 includes an inner race 802 positioned generally within an outer race 804. The outer race 804 includes a plurality of bearing elements 806 affixed thereto that have respective bearing surfaces 808. The inner race 802 also includes a plurality of bearing elements 810 affixed thereto that have respective bearing surfaces 812. One or more, or all of the bearing elements 806 and 810 may be configured according to any of the PDC embodiments disclosed herein. The inner race 802 is positioned generally within the outer race 804, with the inner race 802 and outer race 804 configured so that the bearing surfaces 808 and 812 may at least partially contact one another and move relative to each other as the inner race 802 and outer race 804 rotate relative to each other during use.

While various aspects and embodiments have been disclosed herein, other aspects and embodiments are contemplated. The various aspects and embodiments disclosed herein are for purposes of illustration and are not intended to be limiting. Additionally, the words "including," "having," and variants thereof (e.g., "includes" and "has") as used herein, including the claims, shall be open ended and have the same meaning as the word "comprising" and variants thereof (e.g., "comprise" and "comprises").

What is claimed is:

1. A method of fabricating a polycrystalline diamond compact, comprising:
   providing a polycrystalline diamond table including a plurality of bonded diamond grains defining a plurality of interstitial regions in which a metal-solvent catalyst is disposed;
   leaching the polycrystalline diamond table with a gaseous leaching agent to at least partially remove the metal-solvent catalyst from the polycrystalline diamond table;
   infiltrating the at least partially leached polycrystalline diamond table with a metallic infiltrant from the substrate; and
   bonding the at least partially leached polycrystalline diamond table to the substrate to form the polycrystalline diamond compact.

2. The method of claim 1 wherein the gaseous leaching agent comprises a mixture of a halogen and at least one inert gas.

3. The method of claim 1 wherein the gaseous leaching agent comprises a gas selected from the group consisting of at least one halide gas, at least one inert gas, a gas from the decomposition of an ammonium halide salt, a hydrogen gas, a carbon monoxide gas, an acid gas, a gaseous compound including halogen elements, a hydrogen chloride gas, a hydrogen fluoride gas, a nitrogen gas, and mixtures thereof.

4. The method of claim 1 further comprising:
   prior to the act of bonding, heating the at least partially leached polycrystalline diamond table under partial vacuum conditions to remove at least some leaching by-products therefrom generated during the act of leaching.

5. The method of claim 4 wherein heating the at least partially leached polycrystalline diamond table under partial vacuum conditions to remove at least some leaching by-products therefrom comprises:
   heating the at least partially leached polycrystalline diamond table at a temperature sufficient to sublimate the at least some leaching by-products.

6. The method of claim 5 wherein the temperature is above about 500° C. and below about 700° C.

7. The method of claim 1, further comprising:
   prior to the act of bonding, removing at least some leaching by-products from the at least partially leached polycrystalline diamond table generated during the act of leaching by chemically cleaning the leached polycrystalline diamond table.

8. The method of claim 1, further comprising reducing a non-planarity of an interfacial surface of the at least partially leached polycrystalline diamond table prior to bonding the at least partially leached polycrystalline diamond table to the substrate.

9. The method of claim 8 wherein reducing a non-planarity of the interfacial surface of the at least partially leached polycrystalline diamond table prior to bonding the at least partially leached polycrystalline diamond table to the substrate comprises substantially planarizing the interfacial surface to a flatness of about 0.00050 inch to about 0.0010 inch.

10. The method of claim 8, further comprising:
    prior to the act of bonding, removing at least some leaching by-products from the at least partially leached polycrystalline diamond table generated during the act of leaching; and
    wherein reducing a non-planarity of the interfacial surface of the at least partially leached polycrystalline diamond table prior to bonding the at least partially leached polycrystalline diamond table to the substrate occurs prior to removing the at least some leaching by-products from the at least partially leached polycrystalline diamond table.

11. The method of claim 1 further comprising leaching a portion of the metallic infiltrant present in the infiltrated polycrystalline diamond table to a selected leach depth of about 50 µm to about 800 µm.

12. A method of forming a polycrystalline diamond compact, comprising:
    providing a polycrystalline diamond table including a metal-solvent catalyst distributed throughout and an interfacial surface;
    exposing the polycrystalline diamond table to a gaseous leaching agent including halide anions to remove at least a portion of the metal-solvent catalyst from the polycrystalline diamond table;
    reducing a non-planarity of the interfacial surface of the at least partially leached polycrystalline diamond table;
    after the acts of exposing and reducing, bonding a substrate to the at least partially leached polycrystalline diamond table in a high temperature/high pressure process effective to infiltrate the at least partially leached polycrystalline diamond table with a metallic infiltrant from the substrate and form a polycrystalline diamond compact; and
    exposing the polycrystalline diamond table of the polycrystalline diamond compact to a gaseous leaching agent including halide anions to remove at least a portion of the metallic infiltrant from the polycrystalline diamond table of the polycrystalline diamond compact.

13. The method of claim 12, further comprising:
    prior to the act of bonding, removing at least some leaching by-products from the at least partially leached polycrystalline diamond table generated during the act of leaching by chemically cleaning the leached polycrystalline diamond table.

14. The method of claim 12 wherein reducing a non-planarity of the interfacial surface of the at least partially leached polycrystalline diamond table comprises substantially planarizing the interfacial surface to a flatness of about 0.00050 inch to about 0.0010 inch.

15. The method of claim 12, further comprising:
    prior to the act of bonding, removing at least some leaching by-products from the at least partially leached polycrystalline diamond table generated during the act of leaching; and
    wherein reducing a non-planarity of the interfacial surface of the at least partially leached polycrystalline diamond table occurs prior to removing the at least some leaching by-products from the at least partially leached polycrystalline diamond table.

16. The method of claim 12 wherein exposing the polycrystalline diamond table of the polycrystalline diamond compact to a gaseous leaching agent including halide anions to remove at least a portion of the metallic infiltrant from the polycrystalline diamond table of the polycrystalline diamond compact includes leaching the at least a portion of the metallic infiltrant present in the infiltrated polycrystalline diamond table to a selected leach depth of about 50 µm to about 800 µm.

* * * * *